No. 773,913. PATENTED NOV. 1, 1904.
W. J. BERKELEY.
HARVESTER REEL SUPPORT.
APPLICATION FILED JUNE 6, 1904.
NO MODEL. 4 SHEETS—SHEET 3.
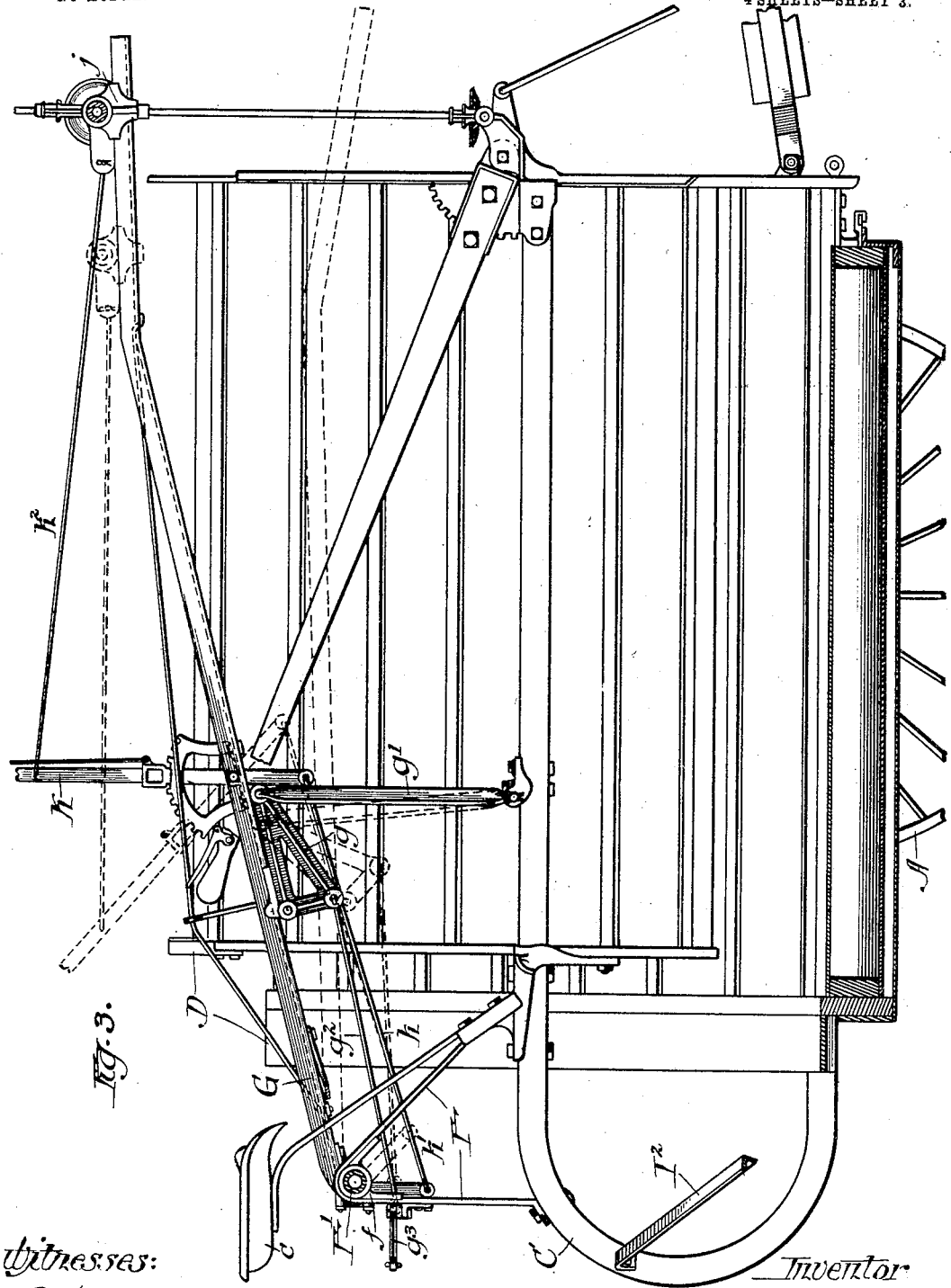
Witnesses:
Inventor
William J. Berkeley
By Chas. M. Chambers,
Attorney.

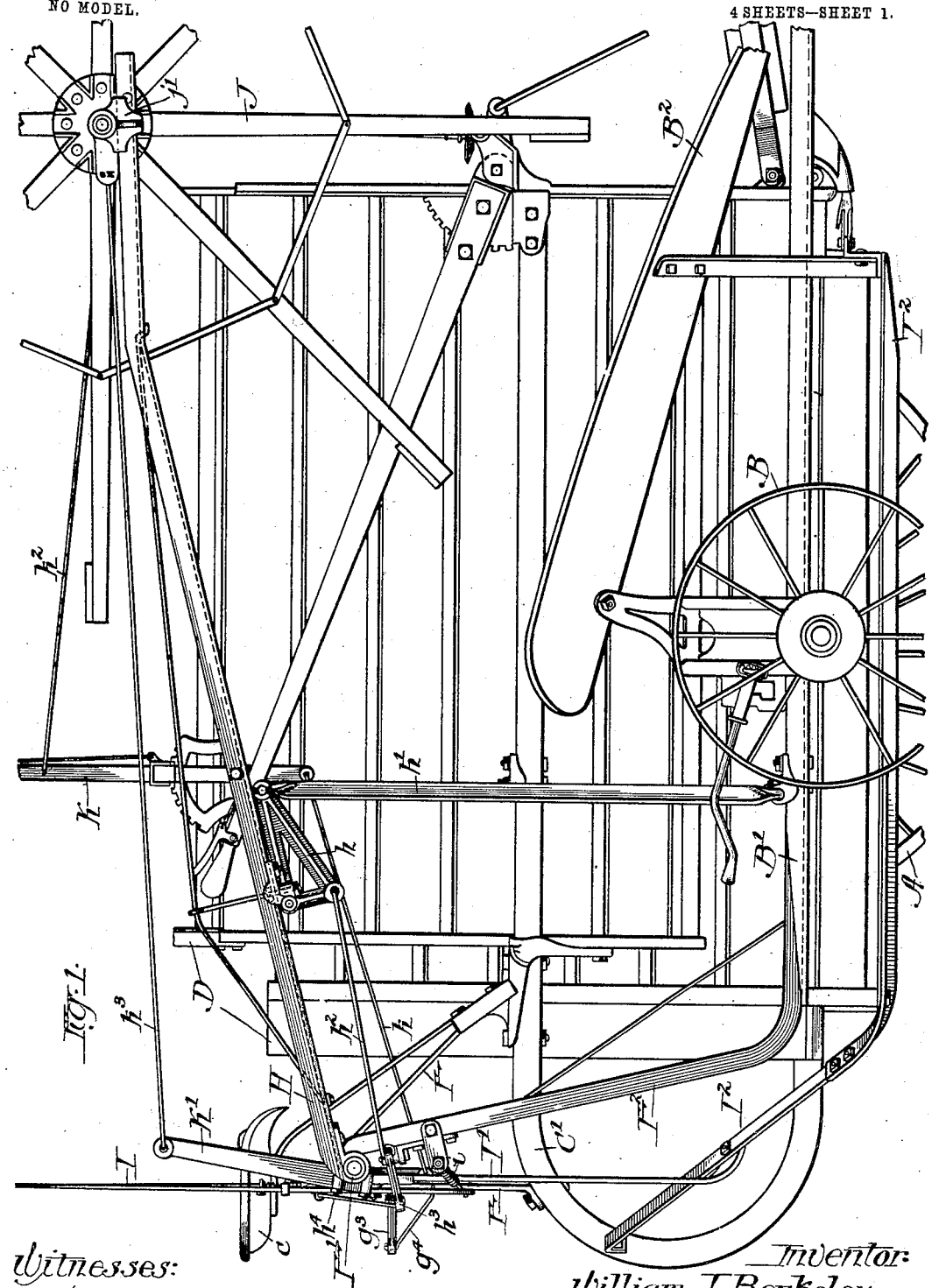

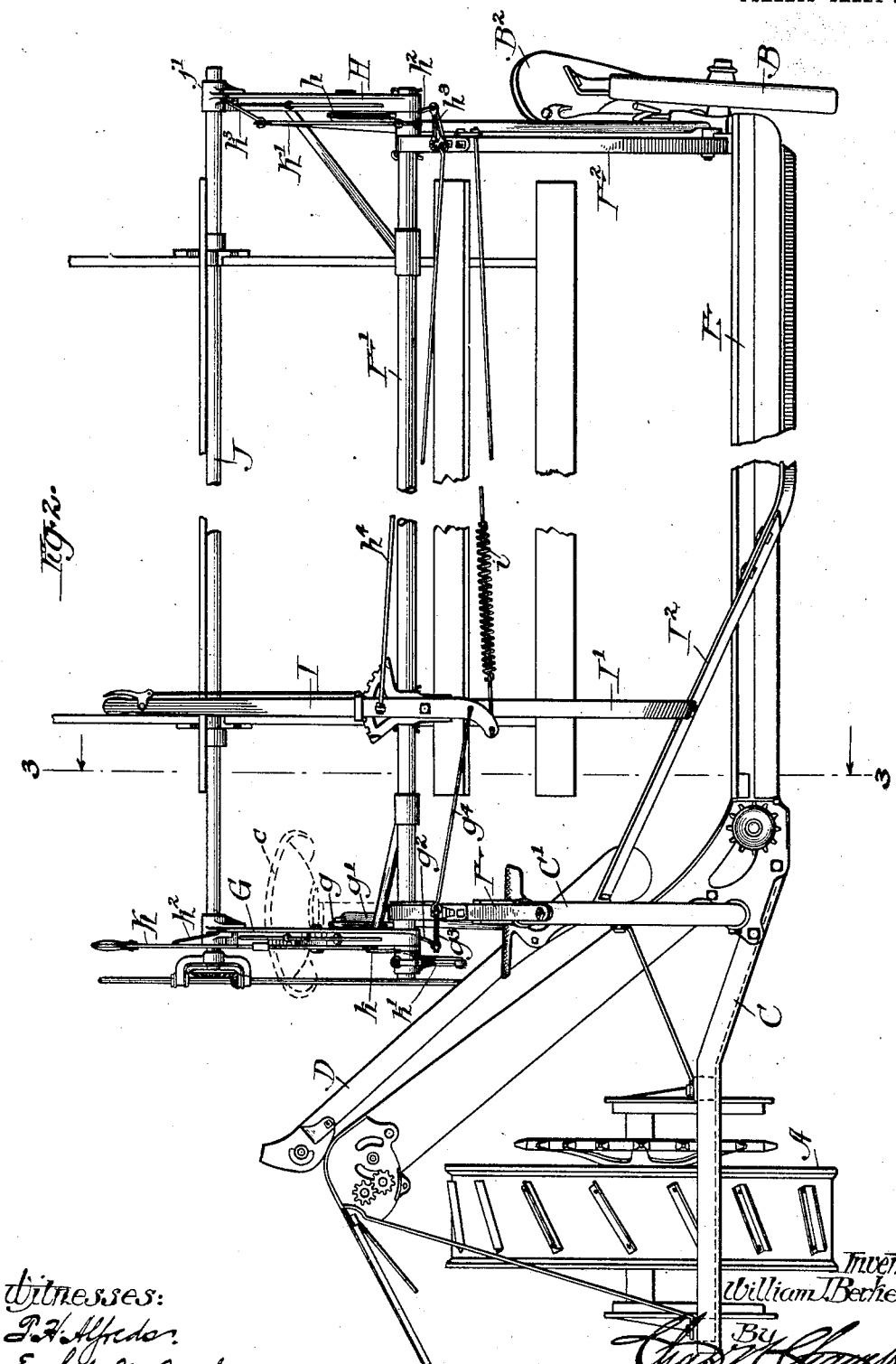

No. 773,913. PATENTED NOV. 1, 1904.
W. J. BERKELEY.
HARVESTER REEL SUPPORT.
APPLICATION FILED JUNE 6, 1904.
NO MODEL. 4 SHEETS—SHEET 4.
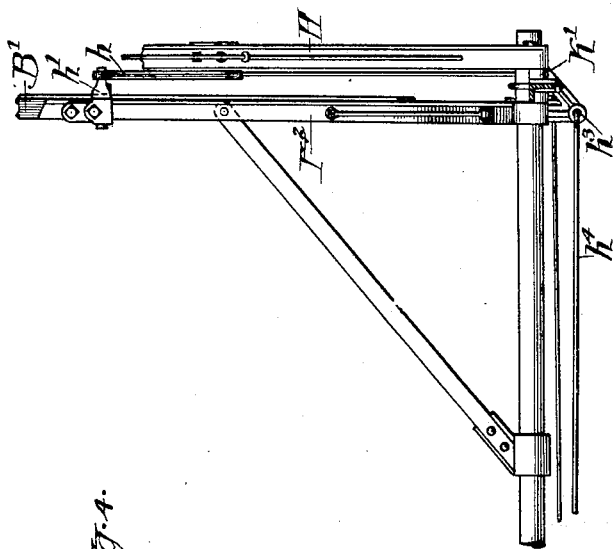
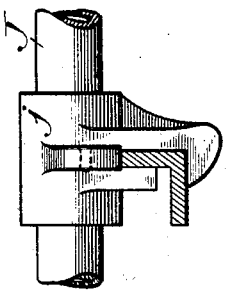
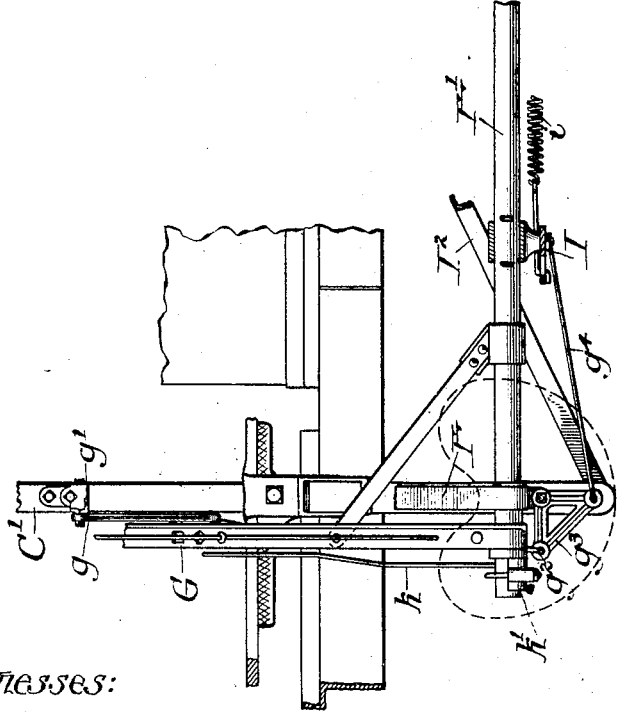
Witnesses:
Inventor:
William J. Berkeley.
By Chas. L. Chambers
Attorney.

No. 773,913.	Patented November 1, 1904.

UNITED STATES PATENT OFFICE.

WILLIAM J. BERKELEY, OF HAMILTON, CANADA, ASSIGNOR TO INTERNATIONAL HARVESTER COMPANY, OF CHICAGO, ILLINOIS, A CORPORATION OF NEW JERSEY.

HARVESTER-REEL SUPPORT.

SPECIFICATION forming part of Letters Patent No. 773,913, dated November 1, 1904.

Application filed June 6, 1904. Serial No. 211,266. (No model.)

*To all whom it may concern:*

Be it known that I, WILLIAM J. BERKELEY, a citizen of the Dominion of Canada, and a resident of Hamilton, in the county of Wentworth and the Province of Ontario, Canada, have invented certain new and useful Improvements in Harvester-Reel Supports, of which the following is a specification, such as will enable those skilled in the art to which it appertains to make and use the same.

The invention relates in general to reels for harvesters. Specifically it relates to supporting and adjusting means for such reels.

It has for its object to provide means which shall operate to support the reel at both ends and to provide means for adjusting the reel vertically and laterally, which are preferably mounted upon the supporting means.

In a narrow-cut harvester the reel may be supported at one end and still operate successfully; but in a harvester of wide cut it is essential but not necessary that the reel be supported at both ends in order to make it rigid enough to admit adjustment near to the finger-bar, as is often required, without being in danger of catching and breaking. Heretofore most wide-cut harvesters have been of the "push" or header type, in which the team is hitched behind the machine and the driver stationed upon the platform at the rear of the push-pole. The reels of such harvesters have usually been supported at both ends, as in the present invention; but the adjustment-levers have been located upon the driver's platform or on the push-pole adjacent thereto. When now it is desired to support the reel of an ordinary harvester of the "pull" type in this manner, it is necessary to mount the support and the adjustment-levers upon the machine itself, with the latter in proximity with the driver's seat and both in such a position that they will not prevent the proper operation of the machine.

The above result is accomplished in a very effective manner by the present invention, an embodiment of which is shown in the accompanying drawings, forming a part hereof, in which like characters of reference designate like parts throughout the several views.

Referring to the drawings, Figure 1 is a side elevation of a harvester of the ordinary pull type, showing the manner of applying the invention. Fig. 2 is a fragmentary rear elevation of the parts illustrated in Fig. 1, showing the lever for adjusting the reel vertically. Fig. 3 is a sectional elevation taken on a plane indicated by line 3 3 of Fig. 2, showing the manner of mounting the inner supporting-arm and the means for adjusting the reel laterally. Fig. 4 is a fragmentary plan view of the reel-support and the means for adjusting the same. Fig. 5 is a detail view of one of the bearings for the reel-shaft, showing its sliding connection with the supporting-arm.

Referring to Figs. 1 and 2, the traction-wheel is designated by A, the grain-wheel by B, the main frame by C, the elevators by D, and the platform by E, all of which parts are constructed in the usual or any preferred manner. Mounted upon and forming a part of the main frame is the seat-support C', which is shown of the usual U-shaped form, upon which is mounted the seat $c$. To this support, beneath the seat, is secured a standard F, which carries a bearing $f$, in which is journaled the inner end of a rock-shaft F'. Mounted upon the rear of the outer sill B' is a standard $F^2$, which is inclined considerably rearward and is provided with a bearing at its upper end for the outer end of rock-shaft F'. Sleeved upon the inner end of this rock-shaft is a reel-supporting arm G and upon the outer end a reel-supporting arm H, each of which is strengthened by suitable truss-rods and provided with suitable braces to resist lateral movement.

By referring to the drawings it will be seen that the rock-shaft is journaled far to the rear and above the platform, so that it will not interfere in any way with the longest grains being placed upon the platform in the proper manner.

Pivoted to the reel-supporting arms G and

H, respectively, are bell-cranks $g$ and $h$. One arm of the bell-crank $g$ is connected with the seat-support C' by means of a link $g'$ in the form of a strut, and the corresponding arm of the bell-crank $h$ is connected with the outer sill B' by means of a corresponding link $h'$, which is pivoted thereto behind the outside divider B² and is also in the form of a strut. The other arm of each of the bell-cranks is connected, by means of links $g^2$ and $h^2$, to one arm of bell-cranks $g^3$ and $h^3$, mounted, respectively upon the standards F and F². The other arms of the last-named bell-cranks are connected, by means of links $g^4$ and $h^4$, to a lever I, which is mounted upon a standard I'. The bell-cranks $g$ and $h$, being mounted upon the reel-supporting arms, are carried high above the platform, where there is no danger of their interfering in any way with the free passage of the grain by its catching thereon, thus obviating the necessity of providing shields, which would otherwise be required. The standard I' is journaled at its upper end upon the rock-shaft F' and supported at its lower end by a diagonal brace I², which extends from the seat-support to the platform-sills, forming a part of the main frame, to which it is secured. The position of this diagonal brace is such that it will not interfere with the passage over the platform of the longest grain which the machine is capable of handling. The lever I is provided with the usual ratchet-quadrant, which is integral with the standard I'. A counterbalancing-spring $i$ reacts between one arm of the lever I and the standard F² for the purpose of counterbalancing the weight of the projecting supporting-arms and the reel. It will be seen that the reel-supporting arms may be raised or lowered about their pivots at their rear ends by the lever I, through the intermediacy of the links and the bell-cranks just described, the latitudinal movement of which is shown by dotted lines in Fig. 3.

The reel J, of the usual or any desired form, is mounted upon the forward ends of the reel-supporting arms in bearings $j$ and $j'$, which have a sliding engagement with the arms, as shown in Fig. 5. Upon the inner supporting-arm is mounted the adjusting-lever K, which is provided with the usual ratchet-quadrant. One arm of this lever is connected, by means of a link $k$, to the rocker-arm $k'$, which is secured to the inner end of the rock-shaft F', and another arm to the bearing $j$ by means of the link $k^2$. A second rocker-arm, K', is secured to the outer end of this rock-shaft and is connected, by means of the link $k^3$, to the bearing $j'$. It will be noticed that the rocker-arm K' and the arm of the lever K through which the link $k^2$ operates are equal in length and that the rocker-arm $k'$ and the arm of the lever K through which the link $k$ operates are also equal in length. The several arms are therefore so proportioned that when the adjustment-lever K is moved the reel is slid laterally an equal distance at each end, thus forming a parallel motion. By these means a simple and effective support for the reel is constructed, which operates to sustain the reel at each end, thereby making it rigid and capable of adjustment throughout its entire scope of movement without being in danger of catching upon any of the stationary parts and causing breakage of one part or another, thus overcoming the objection to reels which are supported at one end only. The reel is also adjustable in any desired position. The adjustment-levers for each are within easy reach of the driver. The operation of such reels is so well understood that in view of the above description of the construction and function of the several parts it is thought that no further description thereof is necessary. In a word, the reel is adjusted vertically by means of the lever I, through the intermediacy of the bell-cranks $g$, $g'$, $h$, and $h'$ and the connecting-links, and laterally by means of the lever K, through the agency of the rock-shaft F' and the connecting-links.

Having thus described my invention, what I claim as new, and desire to secure by Letters Patent, is—

1. In a harvester, in combination with the reel and the main frame, reel-supporting arms one for each end of the reel, pivotally mounted at their rear ends upon the main frame, bell-cranks mounted upon said arms and connected with the main frame and an adjustment-lever mounted upon the main frame and connected with said bell-cranks.

2. In a harvester, the combination with the main frame, of supporting-arms mounted thereon, bell-cranks interposed between said arms and the main frame, an adjustment-lever connected with said bell-cranks, a reel supported at each end upon said arms, and an adjustment-lever mounted upon one of said arms and connected with each end of said reel by a parallel motion.

3. In a harvester, the combination with the main frame, of a rock-shaft mounted thereon, supporting-arms pivoted upon said rock-shaft, bell-cranks interposed between said arms and the main frame, an adjustment-lever connected with said bell-cranks, a reel supported at each end upon said arms, rocker-arms secured to said rock-shaft one of which is connected with said reel and an adjustment-lever mounted upon one of said supporting-arms and connected with said reel and also with another of said rocker-arms.

4. In a harvester, the combination of a main frame, standards mounted thereon at the rear thereof, a rock-shaft journaled in the upper ends of said standards, supporting-arms pivoted at their rear ends upon said rock-shaft, bell-cranks mounted upon said arms and connected with said main frame, an adjustment-lever mounted upon said rock-shaft and connected with said bell-cranks, a reel supported at each end upon said arms, rocker-arms secured to the ends of said rock-shaft one of which is connected with the adjacent end of said reel, and an adjustment-lever mounted upon one of said arms and connected with the adjacent end of said reel and also with another of said rocker-arms.

In testimony whereof I have signed my name to this specification in the presence of two subscribing witnesses.

WILLIAM J. BERKELEY.

Witnesses:
 RICHARD BUTLER,
 GEO. L. RICE.